United States Patent
Lai

(10) Patent No.: US 11,071,362 B2
(45) Date of Patent: Jul. 27, 2021

(54) ADJUSTABLE AND RETRACTABLE ROD APPARATUS

(71) Applicant: LEKISPORT AG, Baar (CH)

(72) Inventor: Hsin Yuan Lai, Taichung (TW)

(73) Assignee: LEKISPORT AG, Baar (CH)

( * ) Notice: Subject to any disclaimer, the term of this patent is extended or adjusted under 35 U.S.C. 154(b) by 0 days.

(21) Appl. No.: 16/763,701

(22) PCT Filed: Dec. 11, 2018

(86) PCT No.: PCT/EP2018/084278
§ 371 (c)(1),
(2) Date: May 13, 2020

(87) PCT Pub. No.: WO2019/129484
PCT Pub. Date: Jul. 4, 2019

(65) Prior Publication Data
US 2020/0297084 A1   Sep. 24, 2020

(30) Foreign Application Priority Data

Dec. 26, 2017  (TW) .................................. 106219212
Jun. 12, 2018  (CH) ...................................... 00748/18

(51) Int. Cl.
*A45B 9/00* (2006.01)
*A45B 9/02* (2006.01)
(Continued)

(52) U.S. Cl.
CPC .................. *A45B 9/02* (2013.01); *A45B 9/00* (2013.01); *A45B 9/04* (2013.01);
(Continued)

(58) Field of Classification Search
CPC ............... A45B 9/00; A45B 2009/005; A45B 2009/007
See application file for complete search history.

(56) References Cited

U.S. PATENT DOCUMENTS 3,669,133 A * 6/1972 Hyman ..................... A45B 9/00
                                                      135/74
7,841,353 B2 * 11/2010 Lee .......................... A45B 9/00
                                                      135/74
(Continued)

FOREIGN PATENT DOCUMENTS

DE        102 15 593 A1    10/2003
DE        10215593 A1 *    10/2003   ............. A63C 11/22
(Continued)

OTHER PUBLICATIONS

International Search Report of PCT/EP2018/084278 dated Feb. 21, 2019 [PCT/ISA/210].
(Continued)

*Primary Examiner* — Noah Chandler Hawk
(74) *Attorney, Agent, or Firm* — Sughrue Mion, PLLC

(57) ABSTRACT

An adjustable and retractable rod includes an external pipe fitting, a multi-section rod and a positioning unit. The multi-section rod includes a first and at least one second foldable rod, where the first and second foldable rods have the same outer diameter, and the positioning unit includes a linkage rope, a positioning component and a locking component, which are used to pull the external pipe fitting and the first foldable rod relative to each other. The linkage rope can be dragged, and the locking component and the positioning unit interlocked or separated. When the locking component and the positioning component are interlocked, the external pipe fitting can be connected to the multi-section rod unit in an unfolded state. When the locking component moves away from the positioning component, the first and second foldable rods of the multi-section rod are folded and in parallel relative to the external pipe fitting.

27 Claims, 12 Drawing Sheets

(51) Int. Cl.
     *A45B 9/04*           (2006.01)
     *A63C 11/24*         (2006.01)
     *F16B 7/14*          (2006.01)

(52) U.S. Cl.
     CPC ... *A45B 2009/007* (2013.01); *A45B 2009/025* (2013.01); *A45B 2200/055* (2013.01); *A63C 11/24* (2013.01); *F16B 7/1418* (2013.01)

(56) References Cited

U.S. PATENT DOCUMENTS

| | | | |
|---|---|---|---|
| 9,609,925 B2* | 4/2017 | Lenhart | A63C 11/227 |
| 9,974,366 B2* | 5/2018 | Heim | A45B 9/00 |
| 2013/0312797 A1* | 11/2013 | Lah | A45B 19/08 |
| | | | 135/74 |
| 2021/0085042 A1* | 3/2021 | Hu | A45B 9/02 |

FOREIGN PATENT DOCUMENTS

| | | | |
|---|---|---|---|
| WO | 2012/104424 A1 | 8/2012 | |
| WO | WO-2016174571 A1 * | 11/2016 | A63C 11/221 |

OTHER PUBLICATIONS

Written Opinion of PCT/EP2018/084278 dated Feb. 21, 2019 [PCT/ISA/237].

* cited by examiner

ADJUSTABLE AND RETRACTABLE ROD APPARATUS

CROSS REFERENCE TO RELATED APPLICATIONS

This application is a National Stage of International Application No. PCT/EP2018/084278, filed Dec. 11, 2018, claiming priorities to Taiwanese Patent Application No. 106219212, filed Dec. 26, 2017 and Swiss Patent Application No. 00748/18, filed Jun. 12, 2018.

TECHNICAL FIELD

The invention relates to a retractable rod, and in particular, to an adjustable and retractable rod apparatus, in particular to be used as walking pole, trekking pole, alpine ski pole, cross-country ski pole and Nordic walking pole.

PRIOR ART

As shown in FIG. 1 and FIG. 2, a foldable multi-section retractable rod includes a hollow upper tube 1, a slideable first lower tube 2 inserted in the upper tube 1, multiple serially connected second lower tubes 3, a linkage rope 4 and a locking pin unit 5. The upper tube 1 is covered with a handle 6 and a hole 201 is set at a location close to the top of the first lower tube 2.

The linkage rope 4 goes through the upper tube 1, the first lower tube 2 and the second lower tube 3 and includes a first end 401 that is fixed on top of the upper tube 1 and a second end 402 that is opposite to the first end 401 and is fixed in a location that is farthest away from the second lower tube 3 of the upper tube 1. The locking pin unit 5 includes a locator 501 that is fixed on top of the first lower tube 2, a clip 502 that is connected to the locator 501 and a locking pin 503 that is fixed at the end of the clip 502.

When the upper tube 1, the first lower tube 2 and the second lower tube 3 are connected to each other in an unfolded state (as shown in the state in FIG. 1), the linkage rope 4 is in a straightened state and has a large tension. The locking pin 503 of the locking pin unit 5 can be extended in the hole 201 and can make the retractable rod reach the maximum length in the use state.

When a user presses the locking pin 503, the tension of the linkage rope 4 is released so that the locking pin 503 is separated from the hole 201. At this time, the operator can retract the first lower tube 2 towards the inside of the upper tube 1. Because the linkage rope 4 already becomes loose, the second lower tube 3 can be separated from the first lower tube 2. Such second lower tube 3 can also be separated from each other. The first lower tube 2 can retract towards inside the upper tube 1 and the second lower tube 3 can be parallel relative to the upper tube 1 (which is not shown in a figure).

When the first lower tube 2 is pulled out relative to the upper tube 1, the second lower tube 3 and the first lower tube 2 can be connected in series to become a straight rod until the locking pin 503 of the locking pin unit 5 extends into the hole 201 and the retractable rod restores to the use state when it has the maximum length.

Although the retractable rod can be unfolded or folded, when the rod is to be unfolded or folded, because the operator must press the locking pin 503 with a finger and the tension of the linkage rope 4 is released, the finger may be injured by the joint between the upper tube 1 and the first lower tube 2 when the locking pin 503 is separated from the hole 201.

SUMMARY OF THE INVENTION

Therefore, the purpose of the invention is to provide an adjustable and retractable rod apparatus that is easy and safe to be folded or unfolded and which can be used as a walking pole, trekking pole, alpine ski pole, cross-country ski pole and Nordic walking pole.

The adjustable and retractable rod apparatus provided in the invention includes an external pipe fitting, a multi-section rod unit and a positioning unit. The external pipe fitting is hollow and extends along an axis. It includes an inner hole set along the axis. The multi-section rod unit includes a first foldable rod and at least one second foldable rod, where the first and second foldable rods have the same outer diameter, can be connected to each other along the axis in an unfolded state and can be separated from each other to be in a foldable state and in parallel relative to the external pipe fitting. When the first and second foldable rods are in an unfolded state, the first foldable rod can be extended inside the inner hole of the external pipe fitting. The positioning unit includes a linkage rope that runs through the external pipe fitting and the multi-section rod unit, a positioning component that is set in the first foldable rod and a locking component that is set in the first foldable rod in a movable way. The linkage rope includes a first end that is fixed on the external pipe fitting and a second end that is opposite to the first end. The second end is connected to the second foldable rod that is the farthest away from the external pipe fitting and the linkage rope can slip through the positioning component and is connected to the locking component. When the first and second foldable rods are in an unfolded state, the locking component is connected to the positioning component. The locking component positions the multi-section rod unit. When the foldable rods are in a foldable state, the locking component is separated from the positioning unit.

The effect of the invention is as follows: By using the overall structure composed of the external pipe fitting, the multi-section rod unit and the positioning unit, only the external pipe fitting and the first foldable rod need to be pulled outside in the opposite direction during operation to switch between an unfolded state and a foldable state. The operation is convenient and avoids the risk of finger injury. In addition, because the first foldable rod can be set in the inner hole of the external pipe fitting due to the same outer diameter of the first and second foldable rods, main rod components of the retractable rod can be made in two outer diameters. As a result, components are simplified.

More specifically, the present invention proposes an adjustable and retractable rod apparatus, comprising:
an external pipe fitting that is hollow, extends along an axis and comprises an inner hole set along the axis;
a multi-section rod unit that comprises a first foldable rod and at least one second foldable rod, wherein the first and second foldable rods have the same outer diameter, can be connected with each other along the axis in an unfolded state and can be separated from each other to be in a foldable state and in parallel relative to the external pipe fitting, and when the first and second foldable rods are in an unfolded state, the first foldable rod can be extended into the inner hole of the external pipe fitting; and
a positioning unit, comprising a linkage rope that runs through the external pipe fitting and the multi-section rod unit, a positioning component that is set in the first foldable rod and a locking component that is set in the first foldable rod in a movable way, wherein the linkage rope comprises a first end that is fixed on the external pipe fitting and a second end that is opposite to the first end, the second end is connected to the second foldable rod that is the farthest away from the external pipe fitting, the linkage rope can slip through the positioning component and is connected to the locking component, when the first and second foldable rods are in an unfolded state, the locking component is connected to the positioning component, the locking component positions the multi-section rod unit, and when the foldable rods are in a foldable state, the locking component is separated from the positioning unit.

According to a first preferred embodiment, when the external pipe fitting is pulled outward in an opposite direction relative to the first foldable rod, the linkage rope can be pulled and the locking component can be separated from the positioning component, and the first and second foldable rods can be changed to a foldable state from the unfolded state.

According to yet another preferred embodiment the positioning unit also comprises a guiding component that can be set in the first foldable rod in a movable way, a pipe stopper that is set on top of the positioning component and an elastic component, the guiding component can push the locking component so that the locking component moves relative to the positioning component, the elastic component is set between the pipe stopper and the locking component and provides elastic force for the locking component, and the linkage rope can be connected to the guiding component, make the locking component locked and connected relative to the positioning component and make the locking component far away from the positioning component.

Another preferred embodiment is characterised in that the positioning component of the positioning unit is hollow and comprises an inner ring surface that surrounds the axis and can form a pipe hole for the linkage rope to run through, multiple positioning teeth that surround the axis and are set by the inner ring surface towards the axis L and multiple chutes, one chute is set between two positioning teeth, each of the positioning teeth comprises a tooth crown part that surrounds the axis and is oblique, a slide guiding part that is set between the tooth crown part and an adjacent chute, surrounds the axis and is oblique, a stop part that is set between the tooth crown part and the slide guiding part and is parallel to the axis and a guiding slot that is parallel to the chutes and can be connected to the tooth crown part, the tooth crown part and the slide guiding part lean towards the same direction, the guiding component may slip through the pipe hole along the axis and comprises a straight pipe part, multiple dragging parts that surround the axis and are set on top of the straight pipe part and multiple guiding blocks that are set on the straight pipe part and can slide along the guiding slot, the dragging parts are in a V shape, each of the dragging parts comprises a pair of V-shaped dragging surfaces, the locking component comprises a hollow pipe wall and multiple locking clips that surround the axis and are set on the pipe wall, the pipe wall can define a penetration hole that is set for the linkage rope to run through, each of the locking clips at the bottom comprises an oblique plane that corresponds to the tooth crown part and the slide guiding part, when the external pipe fitting is pulled outward in an opposite direction relative to the first foldable rod, the linkage rope drives the guiding component to move along the axis, the guiding component then pushes the locking component to make it move upward relative to the positioning component and the oblique plane at the bottom of the locking clips is far away from the tooth crown part, the oblique plane at the bottom of the locking clips rotates around the axis under the guidance of the dragging surface, when the tension of the linkage rope is released during operation, the locking clips smoothly fall into the chutes under the guidance of the guiding part and the guiding component moves downward and is separated from the locking component by using the elastic force released by the elastic component, and the first and second foldable rods may be folded to be in a foldable state and in parallel relative to the external pipe fitting.

Another preferred embodiment is characterised in that each of the positioning teeth of the positioning unit also comprises a guiding part that is set reversely to the tooth crown part and is in a V shape and the locking clips may smoothly fall into the chutes from bottom to top under the effect of the guiding part.

The linkage rope may also have an upper knot and a lower knot that are set between the first end and the second end and are separated, an upper positioning block that can lock and position the upper knot and a lower positioning block that can lock and position the lower knot, the upper positioning block is set on the pipe wall and the lower positioning block is set at the bottom of the straight pipe part.

Furthermore the present invention relates to an adjustable and retractable rod apparatus, also comprising a quick release assembly that is set in where the external pipe fitting and the first foldable rod are connected, wherein the quick release assembly can be operated to make the first foldable rod lock and position the external pipe fitting after the first foldable rod retracts.

More generally speaking, the present invention relates to an adjustable and retractable rod apparatus, preferably in the form of a folding pole having at least three pipe sections and with a pole handle at an uppermost external pipe fitting and a tip at the opposite end of a lowermost pipe section, comprising:

an external pipe fitting that is hollow, extends along an axis and comprises an inner hole set along the axis;

a multi-section rod unit that comprises a first foldable rod and at least one second foldable rod, wherein the first and second foldable rods have the same outer diameter, can be connected with each other along the axis in an unfolded state and can be separated from each other to be in a folded or foldable state and in parallel relative to the external pipe fitting, and when the first and second foldable rods are in an unfolded state, the first foldable rod can be extended into the inner hole of the external pipe fitting; and wherein the adjustable and retractable rod apparatus comprises a positioning unit, comprising and a linkage rope, which linkage rope runs through the external pipe fitting and the multi-section rod unit, wherein the linkage rope comprises a first end that is fixed on the external pipe fitting and a second end that is opposite to the first end, wherein the second end of the linkage rope is connected to the second foldable rod that is the farthest away from the external pipe fitting, and wherein the linkage rope can slip through the positioning component, wherein the positioning unit comprises a positioning component that is set in and attached to the first foldable rod and a locking component, directly and/or indirectly coupled to the linkage rope and located within the first foldable rod, wherein in the unfolded state the positioning component and the locking component are in a positive form-fit engagement such that the linkage rope is under tension in the multi-section rod unit, and wherein to bring the apparatus into a folded state, the external pipe fitting is pulled axially apart from the multi-section rod unit thereby at least partly dragging said locking component and releasing said positive form-fit engagement.

Said locking component can be mounted such as to at least partly slide within an inner ring surface of said positioning component, and wherein said inner ring surface comprises at least one, preferably more than one radially inwardly projecting positioning protrusions or positioning recessions, preferably equally circumferentially distributed, and wherein the locking component comprises at least one, preferably more than one corresponding radially outwardly projecting locking protrusions or locking recessions, preferably equally circumferentially distributed, and wherein positive form-fit engagement is achieved by way of engagement of the projecting positioning protrusions and the projecting locking protrusions and/or corresponding recessions.

There may further be provided a guiding component, mounted such as to at least partly slide within an inner ring surface of said positioning component, and preferably structured such as to at least partly encircle at least part of the locking component, and wherein said guiding component is directly and/or indirectly coupled to the linkage rope and comprises guiding structural elements for dragging the locking component when the external pipe fitting is pulled axially apart from the multi-section rod unit and for controlling the rotational position of the locking component relative to the positioning component.

Whether there is positive form-fit engagement between the positioning component and the locking component preferably depends on the relative rotational position of these two components, the locking component being rotatably mounted in the first foldable rod.

The plug-in connections within the multi-section rod unit, i.e. between the first and second foldable rod and in case of several second foldable rods within these, can be configured in such a manner that on one pipe section they have a guide pin provided with an axially running central through opening for the linkage rope which is firmly fastened in this pipe section with a fastening section and axially opposite thereto has a pin region which can be slid into the other pipe section, wherein between fastening section and pin region there is provided a preferably radially circumferential outwardly directed contact flange which in the assembled state is brought into axial contact with the pipe end of the other pipe section and/or with a pipe closure sleeve provided thereon, wherein preferably this axial stop is configured asymmetrically about the pole axis and/or wherein further preferably the pin region has an at least partially conically tapering region at its end facing the other pipe section.

The quick release assembly may take the form of an external clamping device comprising a plastic sleeve which substantially directly embraces external pipe fitting at least in an axial section and clamps in the closed state, wherein the plastic sleeve at least in the region embracing the external pipe fitting has at least one slot making the circumference of the plastic sleeve variable in this region and is configured to be substantially circumferential in the remaining axial region, wherein respectively one projection is disposed on the plastic sleeve on both sides of this slot, wherein these projections have a coaxial through opening disposed substantially perpendicular to the axis of the external pipe fitting, through which a transverse pin grips, which pin has a stop on the outer side of the second projection and which, on the outer side of the first projection, has an axis of rotation for a clamping lever disposed perpendicular to the axis of the transverse pin and parallel to the axis (L) of the external pipe fitting, wherein the clamping lever has a lever arm which, when the clamping device is closed, embraces the plastic sleeve at least partially and wherein the clamping lever has an eccentric rolling region about the axis of rotation by which means the distance between the stop and a mating surface for clamping disposed on the outer side of the first projection can be reduced by pivoting the clamping lever into the closed position, wherein preferably the mating surface is configured in the form of a metal element disposed at least partially in the first projection in a recess and wherein further preferably the mating surface is configured as a flat surface or as a concave surface whose radius of curvature is substantially adapted to the radius of curvature of the rolling region and wherein further preferably the plastic sleeve has in its upper section at least two, preferably at least three axially running slots, wherein at least one of these slots is disposed between the two projections and preferably these slots are distributed uniformly around the circumference and/or wherein further preferably the said stop is configured to be adjustable, wherein preferably the stop is configured with a thread and the transverse pin is configured with a counter-thread and the stop is configured as a nut or screw, preferably with a circumferential toothed structure and/or a comb and/or a groove for engagement of an adjusting tool.

The adjustable and retractable rod apparatus according may comprise at least four pipe sections, the external pipe fitting, first foldable rod and two second foldable rods.

Put alternatively, the invention relates to an adjustable and retractable rod apparatus, comprising:
  an external pipe fitting that is hollow, extends along an axis and comprises an inner hole set along the axis;
  a multi-section rod unit that comprises a first foldable rod and at least one second foldable rod, wherein the first and second foldable rods have the same outer diameter, can be connected with each other along the axis in an unfolded state and can be separated from each other to be in a foldable state and in parallel relative to the external pipe fitting, and when the first and second foldable rods are in an unfolded state, the first foldable rod can be extended into the inner hole of the external pipe fitting; and
  a positioning unit, comprising a linkage rope that runs through the external pipe fitting and the multi-section rod unit, a positioning component that is set in the first foldable rod and a locking component that is set in the first foldable rod in a movable way, wherein the linkage rope comprises a first end that is fixed on the external pipe fitting and a second end that is opposite to the first end, the second end is connected to the second foldable rod that is the farthest away from the external pipe fitting, the linkage rope can slip through the positioning component and is connected to the locking component, when the first and second foldable rods are in an unfolded state, the locking component is connected to the positioning component, the locking component positions the multi-section rod unit, and when the foldable rods are in a foldable state, the locking component is separated from the positioning unit.

According to a preferred embodiment, the adjustable and retractable rod apparatus as given above is characterized in that, when the external pipe fitting is pulled outward in an opposite direction relative to the first foldable rod, the linkage rope can be pulled and the locking component can be separated from the positioning component, and the first and second foldable rods can be changed to a foldable state from the unfolded state.

According to yet another preferred embodiment, the adjustable and retractable rod apparatus as given above is characterized in that the positioning unit also comprises a guiding component that can be set in the first foldable rod in a movable way, a pipe stopper that is set on top of the positioning component and an elastic component, the guiding component can push the locking component so that the locking component moves relative to the positioning component, the elastic component is set between the pipe stopper and the locking component and provides elastic force for the locking component, and the linkage rope can be connected to the guiding component, make the locking component locked and connected relative to the positioning component and make the locking component far away from the positioning component.

According to another preferred embodiment, the adjustable and retractable rod apparatus as given above is characterized in that the positioning component of the positioning unit is hollow and comprises an inner ring surface that surrounds the axis and can form a pipe hole for the linkage rope to run through, multiple positioning teeth that surround the axis and are set by the inner ring surface towards the axis L and multiple chutes, one chute is set between two positioning teeth, each of the positioning teeth comprises a tooth crown part that surrounds the axis and is oblique, a slide guiding part that is set between the tooth crown part and an adjacent chute, surrounds the axis and is oblique, a stop part that is set between the tooth crown part and the slide guiding part and is parallel to the axis and a guiding slot that is parallel to the chutes and can be connected to the tooth crown part, the tooth crown part and the slide guiding part lean towards the same direction, the guiding component may slip through the pipe hole along the axis and comprises a straight pipe part, multiple dragging parts that surround the axis and are set on top of the straight pipe part and multiple guiding blocks that are set on the straight pipe part and can slide along the guiding slot, the dragging parts are in a V shape, each of the dragging parts comprises a pair of V-shaped dragging surfaces, the locking component comprises a hollow pipe wall and multiple locking clips that surround the axis and are set on the pipe wall, the pipe wall can define a penetration hole that is set for the linkage rope to run through, each of the locking clips at the bottom comprises an oblique plane that corresponds to the tooth crown part and the slide guiding part, when the external pipe fitting is pulled outward in an opposite direction relative to the first foldable rod, the linkage rope drives the guiding component to move along the axis, the guiding component then pushes the locking component to make it move upward relative to the positioning component and the oblique plane at the bottom of the locking clips is far away from the tooth crown part, the oblique plane at the bottom of the locking clips rotates around the axis under the guidance of the dragging surface, when the tension of the linkage rope is released during operation, the locking clips smoothly fall into the chutes under the guidance of the guiding part and the guiding component moves downward and is separated from the locking component by using the elastic force released by the elastic component, and the first and second foldable rods may be folded to be in a foldable state and in parallel relative to the external pipe fitting.

Each of the positioning teeth of the positioning unit can also comprise a guiding part that is set reversely to the tooth crown part and is in a V shape and the locking clips may smoothly fall into the chutes from bottom to top under the effect of the guiding part.

The linkage rope may also comprise an upper knot and a lower knot that are set between the first end and the second end and are separated, an upper positioning block that can lock and position the upper knot and a lower positioning block that can lock and position the lower knot, the upper positioning block is set on the pipe wall and the lower positioning block is set at the bottom of the straight pipe part.

According to a preferred embodiment, the adjustable and retractable rod apparatus as given above is characterized in that it also comprises quick release assembly that is set in where the external pipe fitting and the first foldable rod are connected, wherein the quick release assembly can be operated to make the first foldable rod lock and position the external pipe fitting after the first foldable rod retracts.

Further embodiments of the invention are laid down in the dependent claims.

BRIEF DESCRIPTION OF THE DRAWINGS

The features and effects of the present invention will be clearly presented in embodiments of the drawings, where.

Preferred embodiments of the invention are described in the following with reference to the drawings, which are for the purpose of illustrating the present preferred embodiments of the invention and not for the purpose of limiting the same.

DESCRIPTION OF PREFERRED EMBODIMENTS

Figure 1:
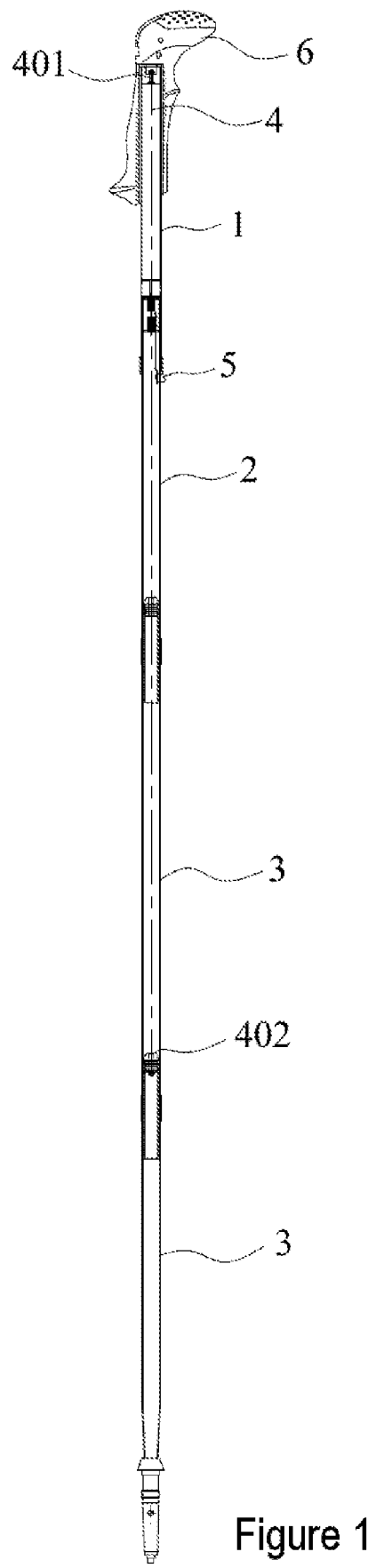
FIG. 1 is a composite profile of a retractable rod apparatus.
Figure 2:
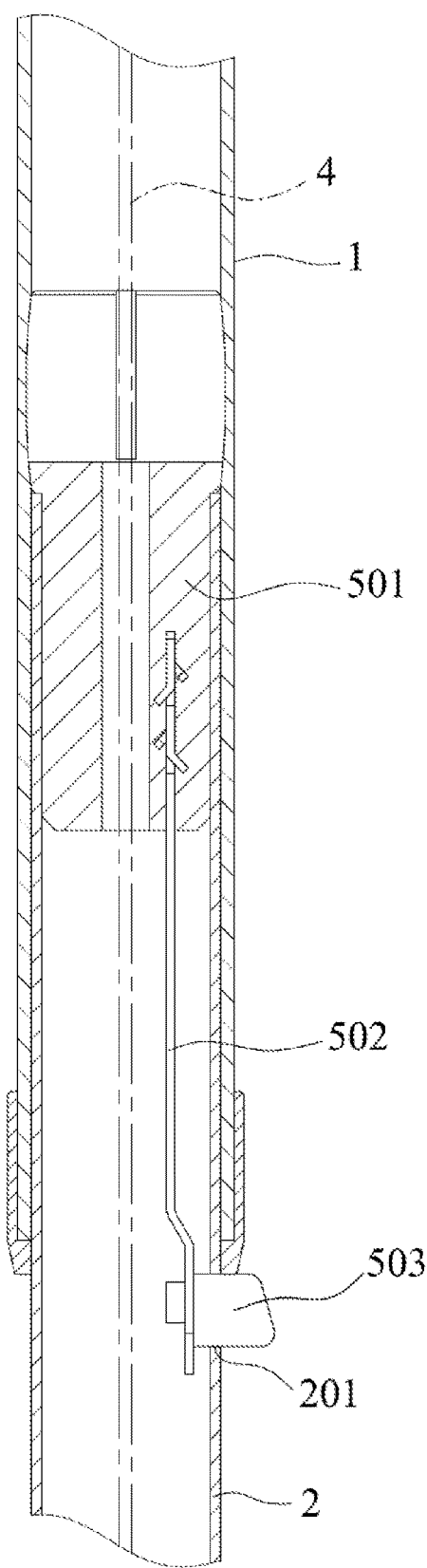
FIG. 2 is a local enlarged schematic diagram of FIG. 1.
Figure 3:
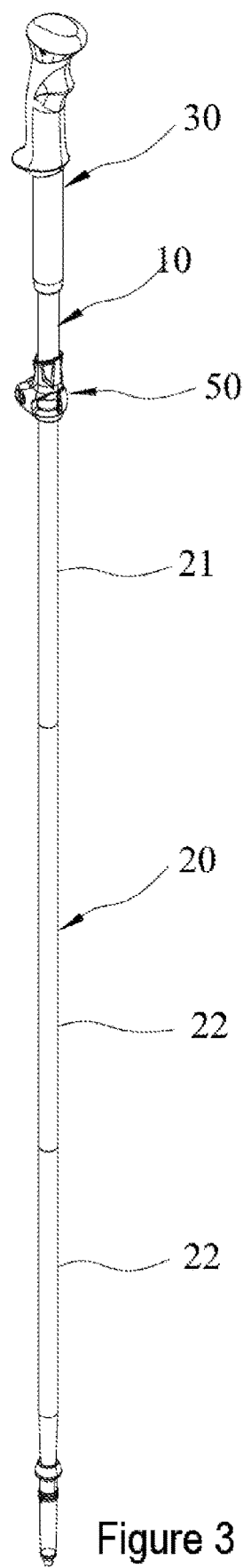
FIG. 3 is a stereoscopic composite chart of an adjustable and retractable rod apparatus according to an embodiment of the present invention.
Figure 4:
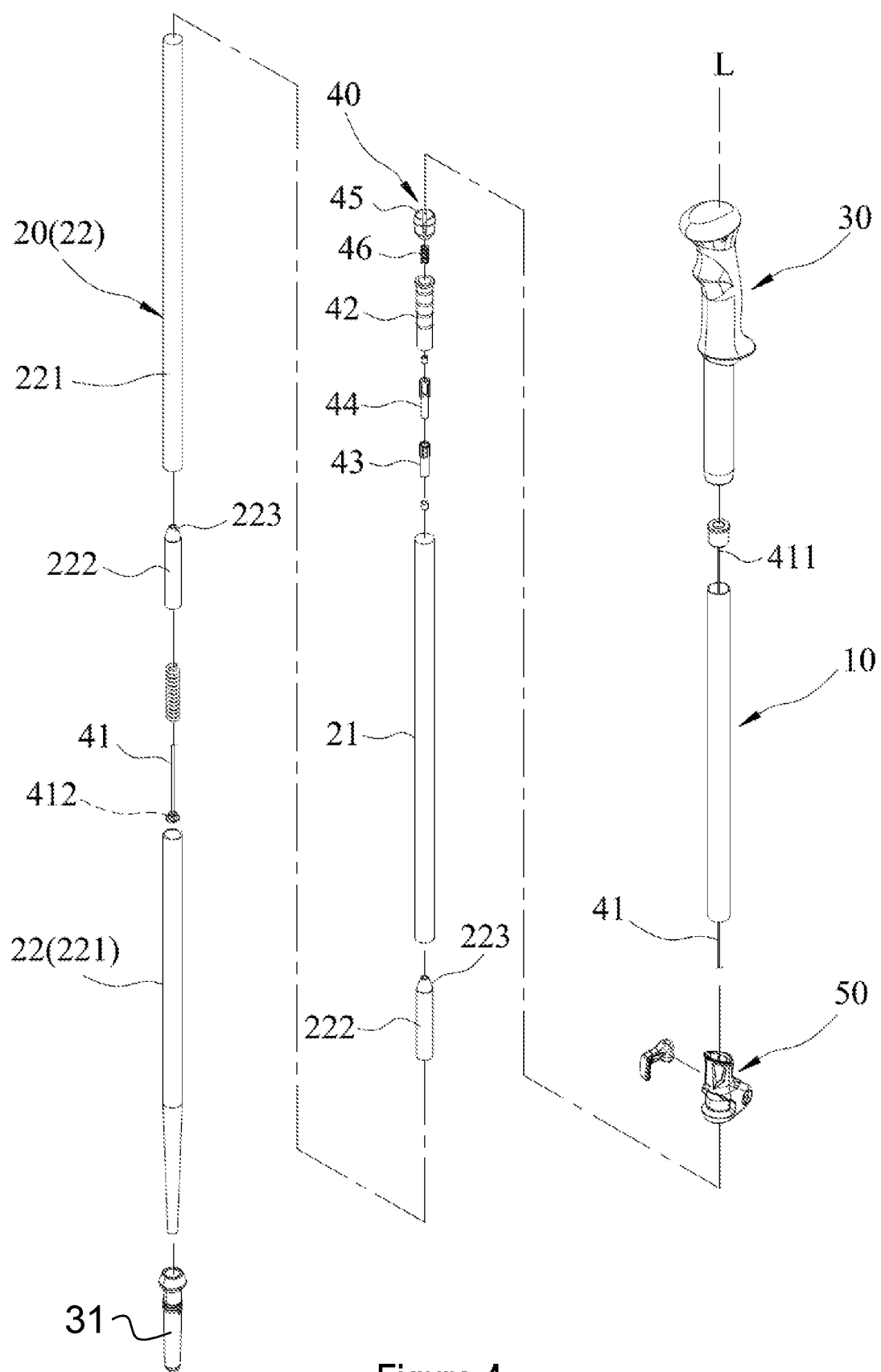
FIG. 4 is a stereoscopic breakdown drawing of the embodiment.
Figure 7:
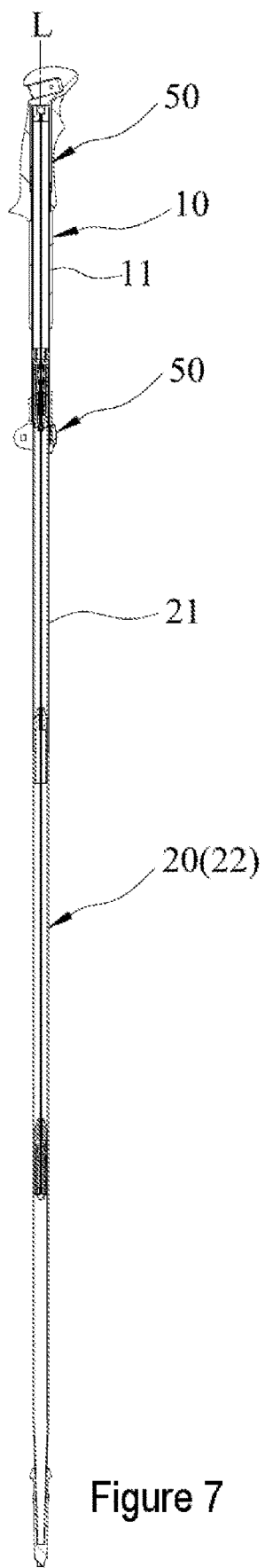
FIG. 7 is a cutaway drawing of the embodiment.

With reference to FIG. 3, FIG. 4 and FIG. 7, the adjustable and retractable rod apparatus according to an embodiment of the present invention includes an external pipe fitting 10, a multi-section rod unit 20, a handle 30 set outside the external pipe fitting 10, a positioning unit 40 and a quick release assembly 50.

The external pipe fitting 10 is hollow and extends along an axis L. It includes an inner hole 11 set along the axis L.

Figure 12:
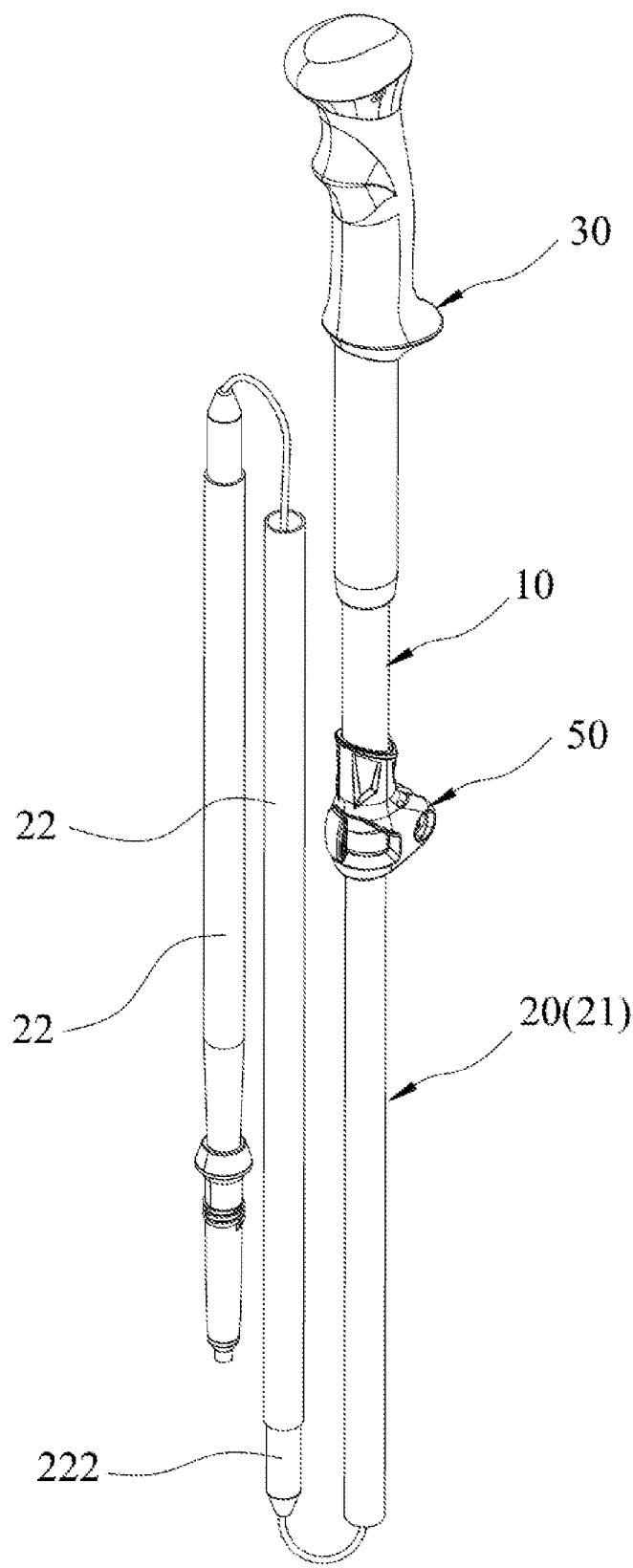
FIG. 12 is a folded schematic diagram of the embodiment.

The multi-section rod unit 20 includes a first foldable rod 21 that retracts or extends relative to the external pipe fitting 10 and multiple second foldable rods 22 that can be attached or detached to the first foldable rod 21. The first foldable rod 21 and the second foldable rods 22 have the same outer diameter. The first foldable rod 21 is hollow at both ends and the second foldable rods 22 can be connected with each other along the axis L or be separated to become parallel to each other. A second foldable rod 22 adjacent to the first foldable rod 21 may be connected to the first foldable rod 21 along the axis L (as shown in FIG. 7) or they may be separated to become parallel to each other (as shown in FIG. 12) relative to the first foldable rod 21. The second foldable rod 22 includes a main rod body 221 that is hollow and straight at both ends and a sleeve 222 that is set on top of the main rod body 221. The sleeve 222 has an outer diameter smaller than that of the main rod body 221, can extend into the inside of the first foldable rod 21 or the second foldable rod 22, and includes a conical end 223, and with the conical end 223, the sleeve 222 for two adjacent second foldable rods 22 can be easily connected to the main rod body 221.

Figure 5:
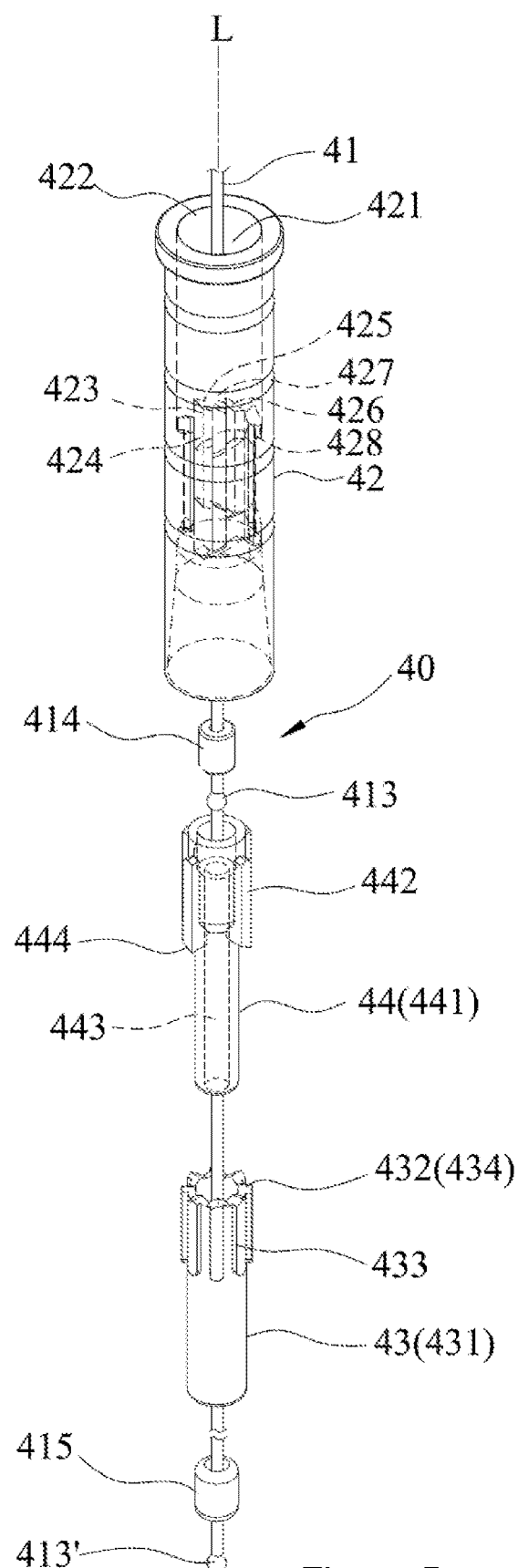
FIG. 5 is an incomplete stereoscopic breakdown drawing of the embodiment.
Figure 6:
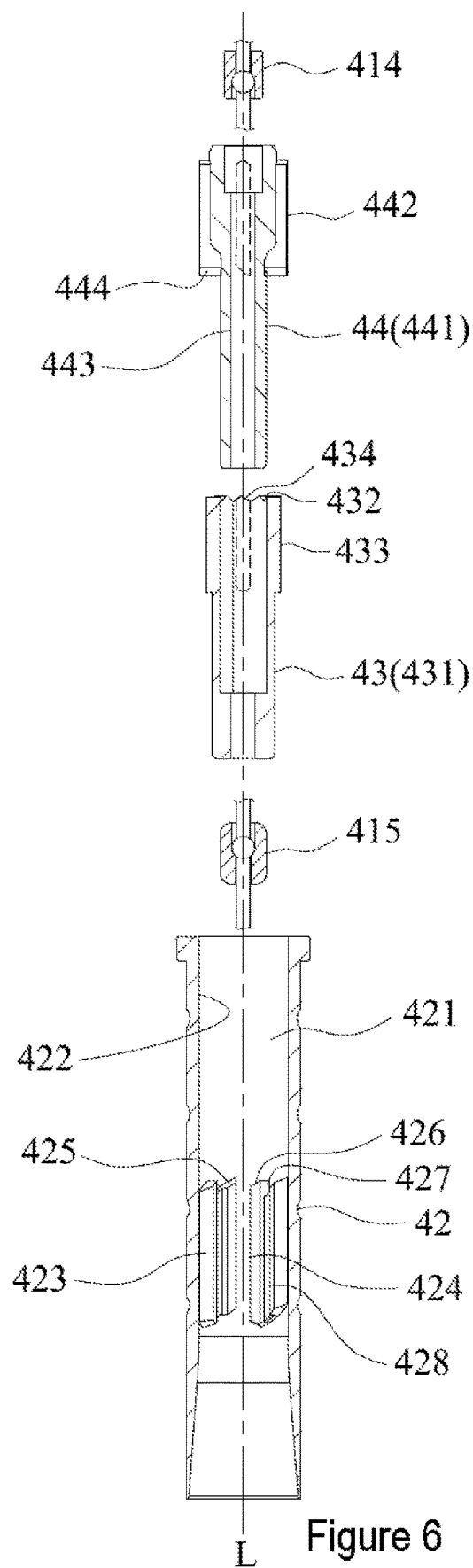
FIG. 6 is an incomplete plane breakdown drawing of the embodiment.
Figure 8:
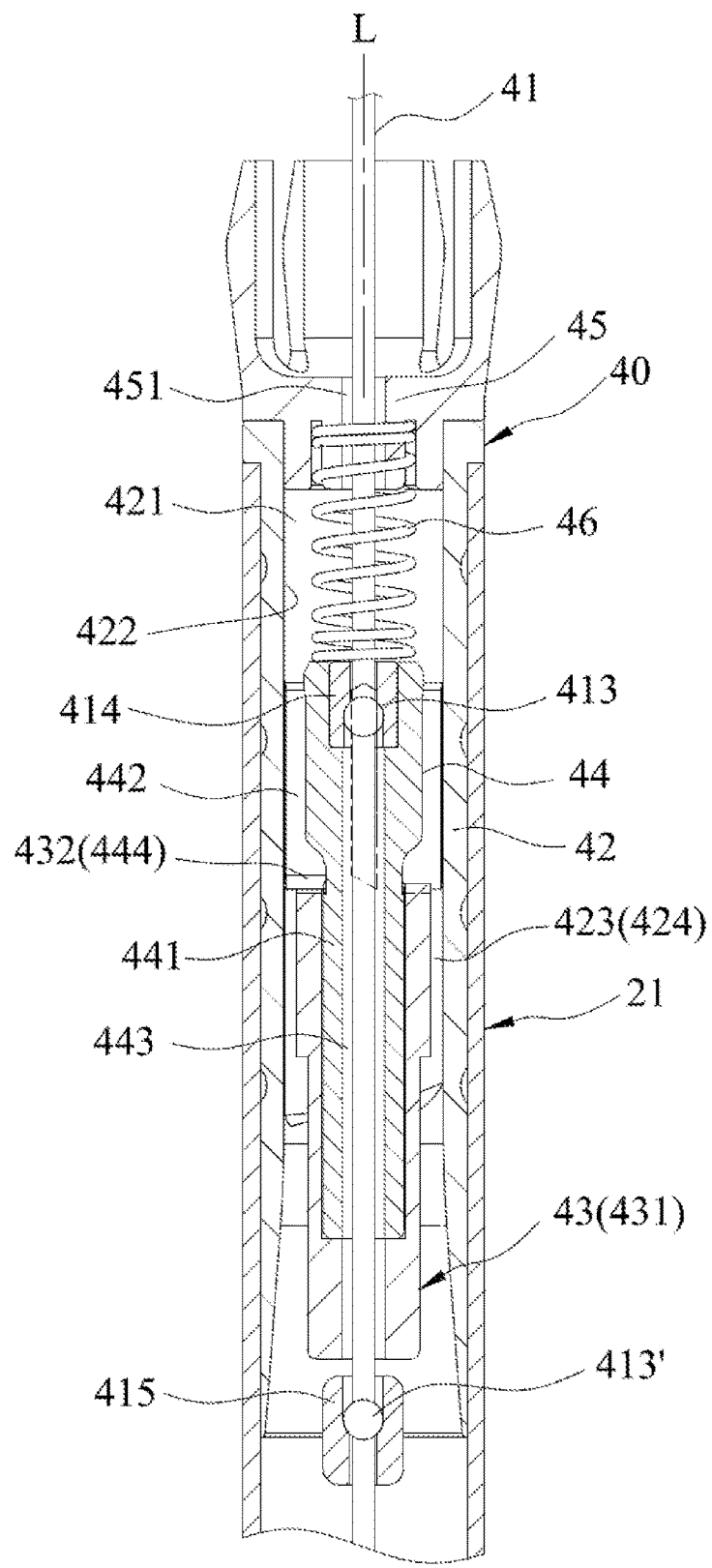
FIG. 8 is a local enlarged schematic diagram of FIG. 7.

With reference to FIG. 5, FIG. 6 and FIG. 8, the positioning unit 40 includes a linkage rope 41 that runs through the external pipe fitting 10 and the multi-section rod unit 20, a positioning component 42, a guiding component 43 that can be set in the first foldable rod 21 in a movable way, a locking component 44 that can be dragged by the guiding component 43 and rotates around the axis L, a pipe stopper 45 that is set on top of the positioning component 42 and an elastic component 46 that is set between the pipe stopper 45 and the locking component 44 and provides elastic force for the locking component 44.

The linkage rope 41 adopts a continuously extended nylon rope and includes a first end 411 that is fixed on top of the external pipe fitting 10, a second end 412 that is opposite to the first end 411, an upper knot 413 and a lower knot 413' that are set between the first end 411 and the second end 412 (see FIG. 4) and are separated, an upper positioning block 414 that can lock and position the upper knot 413 and a lower positioning block 415 that can lock and position the lower knot 413'. The second end 412 is fixed on top of a second foldable rod 22 that is the farthest away from the first foldable rod 21.

Figure 9:
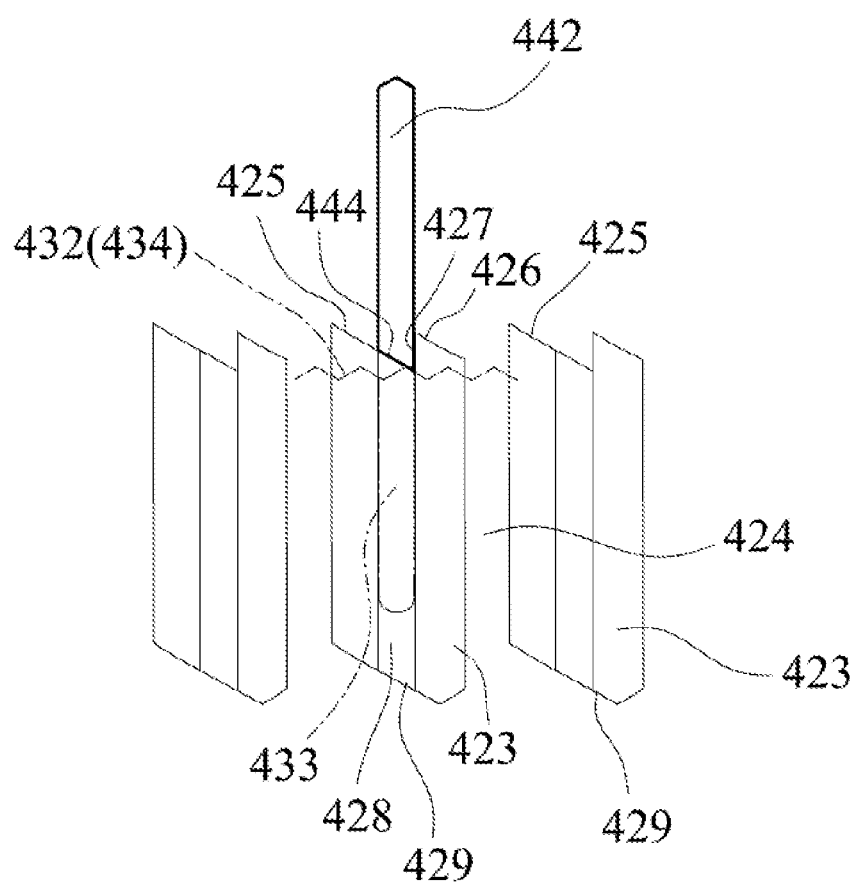
FIG. 9 is a planar expansion schematic diagram of the embodiment, describing the locking and positioning state generated by a locking component relative to a positioning component.

With reference to FIG. 8 and FIG. 9, the positioning component 42 is set on top of the first foldable rod 21 that is adjacent to the external pipe fitting 10, is hollow and includes a pipe hole 421 that surrounds the axis L and can be used for the linkage rope 41 to run through, an inner ring surface 422, multiple positioning teeth 423 that surround the axis L and are set by the inner ring surface 422 towards the axis L, and multiple chutes 424. One chute 424 is set between two positioning teeth 423 and each of the positioning teeth 423 includes a tooth crown part 425 that surrounds the axis L, is oblique, a slide guiding part 426 that is set between the tooth crown part 425 and an adjacent chute 424, surrounds the axis L and is oblique, a stop part 427 that is set between the tooth crown part 425 and the slide guiding part 426 and is parallel to the axis L, and a guiding slot 428 that is parallel to the chutes 424 and can be connected or rather leads to the tooth crown part 425. The tooth crown part 425 and the slide guiding part 426 lean towards the same direction. In addition, each of the positioning teeth 423 includes a guiding part 429 that is set opposite to the tooth crown part 425 and is in a V shape.

The guiding component 43 may slip through the pipe hole 421 along the axis L and includes a straight pipe part 431, multiple dragging parts 432 that surround the axis L and are set on top of the straight pipe part 431, and multiple guiding blocks 433 that are set on the straight pipe part 431 and can slide along the guiding slot 428. The dragging parts 432 are in a V shape and each of the dragging parts includes a pair of V-shaped dragging surfaces 434. The lower positioning block 415 may stop at the bottom of the straight pipe part 431.

The locking component 44 includes a hollow pipe wall 441 and multiple locking clips 442 that surround the axis L and are set on the pipe wall 441. The pipe wall 441 can define a penetration hole 443 that is set for the linkage rope 41 to run through. The upper positioning block 414 can be set and located on top of the penetration hole 443 and is set on the pipe wall 441. At the bottom, each of the locking clips 442 includes an oblique plane 444 that corresponds to the tooth crown part 425 and the slide guiding part 426.

The pipe stopper 45 includes a round hole 451 that extends along the axis L and is used for the linkage rope 41 to run through.

The quick release assembly 50 is set in where the external pipe fitting 10 is connected to the first foldable rod 21 to make the first foldable rod 21 lock and position the external pipe fitting 10 after the first foldable rod 21 retracts.

FIG. 7, FIG. 8 and FIG. 9 show the assembled adjustable retractable rod apparatus according to an embodiment of the present invention. The first foldable rod 21 and the second foldable rod 22 are connected to each other along the axis L and are in an unfolded state. In this case, the oblique plane 444 at the bottom of the locking clips 442 of the locking component 44 leans against the tooth crown part 425 and the sides of the locking clips 442 lean against the corresponding stop part 427. There is thus a positive engagement of the locking component 44 in or at the positioning component 42, and due to the linkage rope 41 being attached to the locking component 44 by way of the upper knot 413 and the upper positioning block 415, the linkage rope 41 is under high tension in the multi-section rod unit 20 preventing to relatively axially shift and disengage the rods of the multi-section rod unit 20, and to fold them. The linkage rope 41 between the upper knot 413 and the second end 412 is in the shape of a straight line and has large tension. The linkage rope 41 between the upper knot 413 and the first end 411 becomes slack or tense depending on the degree of stretching or retraction of the first foldable rod 21 relative to the external pipe fitting 10. The locking component 44 is connected to the positioning component 42 through locking and the locking component positions at the multi-section rod unit 20.

When the multi-section rod unit 20 is unfolded, the stretching or retraction of the first foldable rod 21 can be adjusted relative to the external pipe fitting 10 by using the quick release assembly 50 and the length of the retractable rod apparatus can be adjusted. After the length is adjusted, the quick release assembly 50 can be used for locking and positioning.

When a user wants to fold the retractable rod apparatus, the operator first makes the quick release assembly 50 in a loose state and then holds the handle 30 (the external pipe fitting 10) and the first foldable rod 21 and pulls them towards the opposite direction, i.e. axially apart. In this case, because the upper knot 413 of the linkage rope 41 positions the locking component 44, the second end 412 is fixed on top of a second foldable rod 22 that is farthest away from the first foldable rod 21, the lower positioning block 415 locks and positions at the lower knot 413', and the lower positioning block 415 also presses against the bottom of the straight pipe part 431 such that the linkage rope 41, the guiding component 43 and the locking component 44 are dragged when the handle 30 is pulled. As detailed in the following, this releases the positive engagement between the locking component 44 and the positioning component 42, and thus releases the tension on the linkage rope, thereby allowing to relatively axially shift and disengage the rods of the multi-section rod unit 20, and to fold them.

Figure 10:
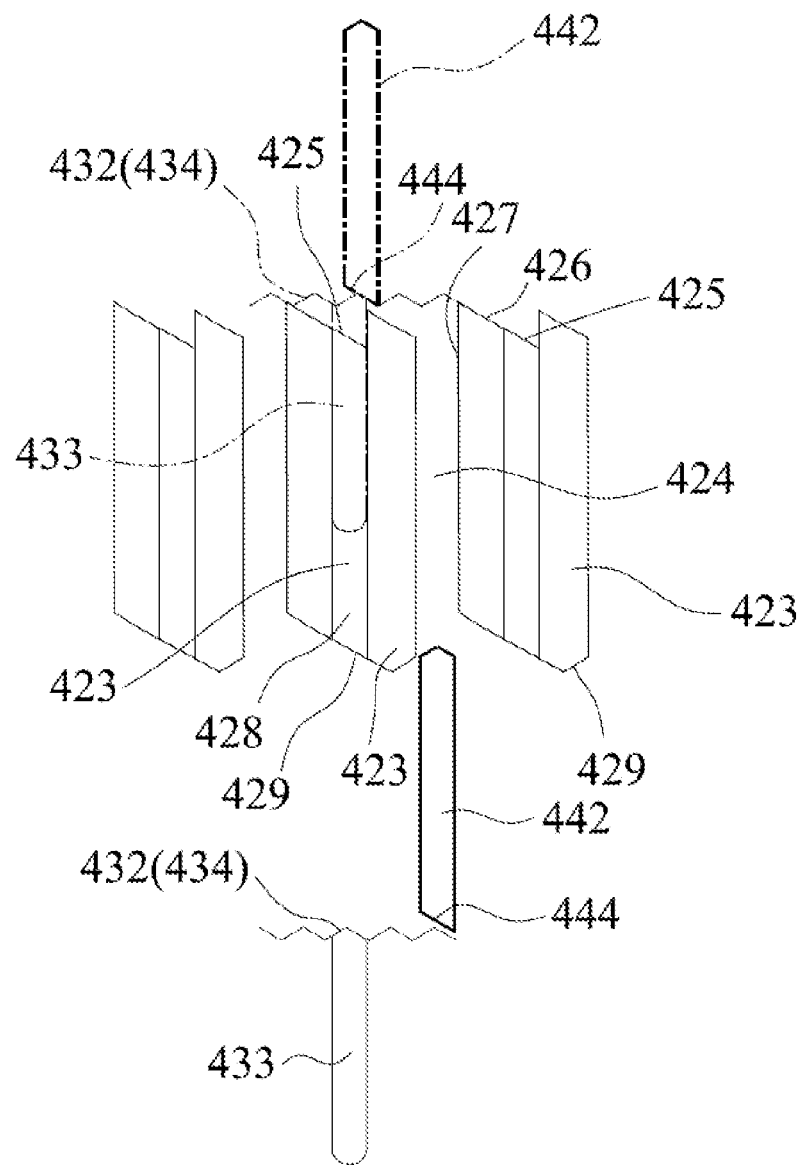
FIG. 10 is another planar expansion schematic diagram of the embodiment, describing the jacking generated by a guiding component relative to the positioning component.
Figure 11:
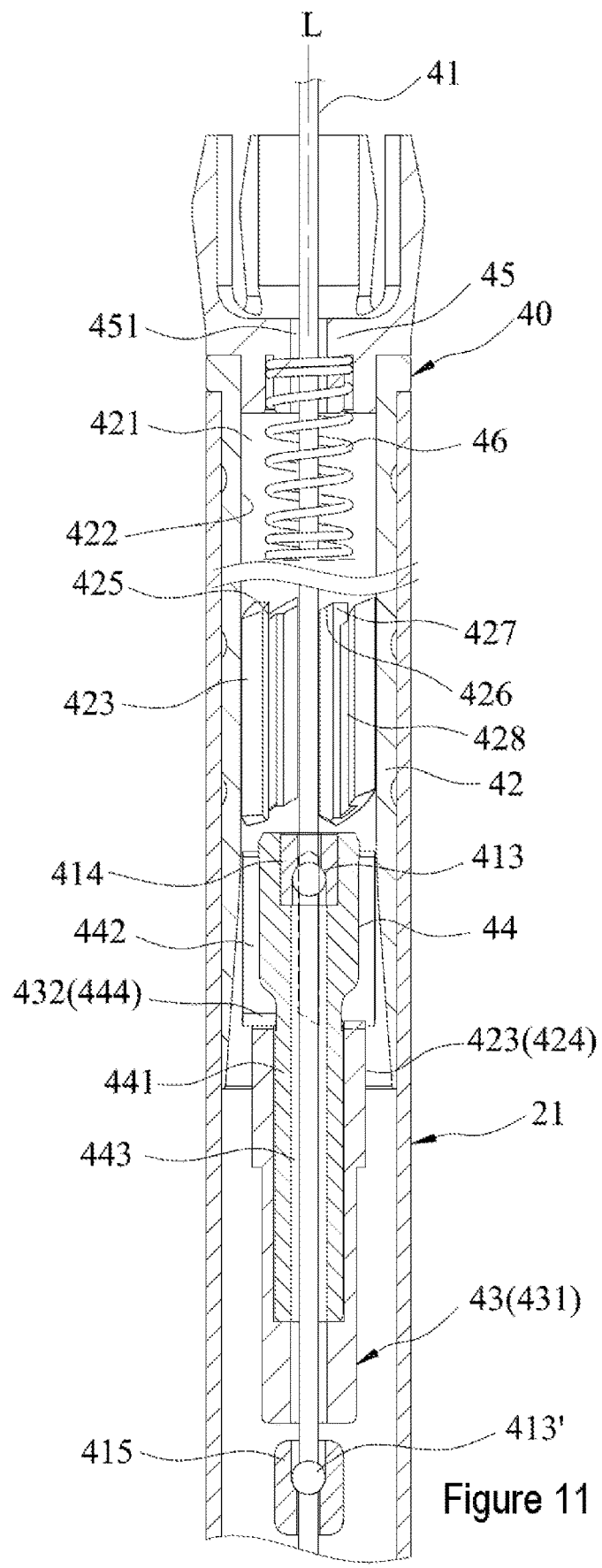
FIG. 11 is another planar expansion schematic diagram of the embodiment, describing the sliding status generated by the locking component relative to the positioning component.

As shown in FIG. 10, with reference to FIG. 8, as the guiding component 43 is pulled by the linkage rope 41, the dragging part 432 can be used to push the locking component 44 upward relative to the positioning component 42, and when the oblique plane 444 at the bottom of the locking clips 442 moves away from the tooth crown part 425 so that the locking clips 442 also move away from the corresponding stop part 427 (in this case, the elastic component 46 is in a compressed state and contains the released elastic force), the oblique plane 444 of the locking clips 442 rotates around the axis L, being guided by the dragging surface 434. When the tension of the linkage rope 41 is released during operation, the locking clips 442 smoothly fall into the chutes 424, being guided by the guiding part 426, and the guiding component 43 moves downward and is axially separated from the positioning component 42 (in a state shown in FIG. 11) by using the elastic force released by the elastic component 46. In this case, the tension of the linkage rope 41 disappears, the second foldable rods 22 may be separated from the first foldable rod 21, the second foldable rods 22 themselves may also be separated from each other, and the first foldable rod 21 and the second foldable rods 22 may be folded to become parallel with each other relative to the external pipe fitting 10 (see FIG. 12).

When the multi-section rod unit 20 needs to be changed to an unfolded state from the foldable state again, the operator pulls the handle 30 and the first foldable rod 21 outward in an opposite direction and pushes the guiding component 43 to the bottom by using the lower knot 413' of the linkage rope 41. The locking clips 442 smoothly slide into the chutes 424 under the effect of the guiding part 429 and the dragging part 432 pushes the locking component 44 upward again. The oblique plane 444 at the bottom of the locking clips 442 rotates around the axis L under the guidance of the dragging surface 434 and the locking clips 442 smoothly fall into the tooth crown part 425 when the tension of the linkage rope 41 is released. The linkage rope 41 recovers to a state with large tension and can recover to the unfolded state shown in FIG. 7, FIG. 8 and FIG. 9.

Therefore, the adjustable and retractable rod apparatus according to an embodiment of the present invention can switch between an unfolded state and a foldable state by pulling the handle 30 and the first foldable rod 21. The operation is convenient and avoids the risk of finger injury.

Moreover, because the first foldable rod 21 and the second foldable rods 22 have the same outer diameter and the first foldable rod 21 can extend into the inner hole 11 of the external pipe fitting 10, the main rod components of the retractable rod can be made in two outer diameters only. This simplifies the components, facilitates the manufacturing and makes material management more convenient. In other words, the adjustable and retractable rod apparatus according to an embodiment of the present invention can really achieve the purpose of the present invention.

The above description is only an embodiment of the invention and may not limit the scope of the invention. Any simple and equivalent changes and modifications made based on the claims of the present application of the invention and the content of the specification are included in the scope of the invention.

LIST OF REFERENCE SIGNS

| | |
|---|---|
| 10 | External pipe fitting |
| L | Axis |
| 11 | Inner hole |
| 20 | Multi-section rod unit |
| 21 | First foldable rod |
| 22 | Second foldable rod |
| 221 | Main rod body |
| 222 | Sleeve |
| 223 | Head end |
| 30 | Handle |
| 31 | Tip |
| 40 | Positioning unit |
| 41 | Linkage rope |
| 411 | First end |
| 412 | Second end |
| 413 | Upper knot |
| 413' | Lower knot |
| 414 | Upper positioning block |
| 415 | Lower positioning block |
| 42 | Positioning component |
| 421 | Pipe hole |
| 422 | Inner ring surface |
| 423 | Positioning tooth |
| 424 | Chute |
| 425 | Tooth crown part |
| 426 | Slide guiding part |
| 427 | Stop part |
| 428 | Guiding slot |
| 429 | Guiding part |
| 43 | Guiding component |
| 431 | Straight pipe part |
| 432 | Dragging part |
| 433 | Guiding block |
| 434 | Dragging surface |
| 44 | Locking component |
| 441 | Pipe wall |
| 442 | Locking clip |
| 443 | Penetration hole |
| 444 | Oblique plane |
| 45 | Pipe stopper |
| 451 | Round hole |
| 46 | Elastic component |
| 50 | Quick release assembly |

The invention claimed is:

1. An adjustable and retractable rod apparatus comprising:
    an external pipe fitting that is hollow, extends along an axis and comprises an inner hole set along the axis; and
    a multi-section rod unit that comprises a first foldable rod and at least one second foldable rod,
    wherein the first and second foldable rods have the same outer diameter, can be connected with each other along the axis in an unfolded state and can be separated from each other to be in a folded or foldable state and in parallel relative to the external pipe fitting, and when the first and second foldable rods are in an unfolded state, the first foldable rod can be extended into the inner hole of the external pipe fitting,
    wherein the adjustable and retractable rod apparatus comprises a positioning unit, and a linkage rope, which a linkage rope runs through the external pipe fitting and the multi-section rod unit,
    wherein the linkage rope comprises a first end that is fixed on the external pipe fitting and a second end that is opposite to the first end, wherein the second end of the linkage rope is connected to the second foldable rod that is the farthest away from the external pipe fitting,
    wherein the linkage rope can slip through the positioning component,
    wherein the positioning unit comprises a positioning component that is set in and attached to the first foldable rod and a locking component, directly and/or indirectly coupled to the linkage rope and located within the first foldable rod, wherein in the unfolded state the positioning component and the locking component are in a positive form-fit engagement such that the linkage rope is under tension in the multi-section rod unit, and wherein to bring the apparatus into a folded state, the external pipe fitting is pulled axially apart from the multi-section rod unit thereby at least partly dragging said locking component and releasing said positive form-fit engagement.

2. The apparatus according to claim 1, wherein said locking component is mounted such as to at least partly slide within an inner ring surface of said positioning component, and wherein said inner ring surface comprises at least one or more than one radially inwardly projecting positioning protrusions or positioning recessions, wherein the locking component comprises at least one, or more than one corresponding radially outwardly projecting locking protrusions or locking recessions, and wherein positive form-fit engagement is achieved by way of engagement of the projecting positioning protrusions and the projecting locking protrusions and/or corresponding recessions.

3. The apparatus according to claim 1, wherein there is further provided a guiding component, mounted such as to at least partly slide within an inner ring surface of said positioning component, and wherein said guiding component is directly and/or indirectly coupled to the linkage rope and comprises guiding structural elements for dragging the locking component when the external pipe fitting is pulled axially apart from the multi-section rod unit and for controlling the rotational position of the locking component relative to the positioning component.

4. The apparatus according to claim 1, wherein whether there is positive form-fit engagement between the positioning component and the locking component depends on the relative rotational position of these two components, the locking component being rotatably mounted in the first foldable rod.

5. The apparatus according to claim 1, wherein the locking component is set in the first foldable rod in a movable way, wherein the linkage rope comprises a first end that is fixed on the external pipe fitting and a second end that is opposite to the first end, the second end is connected to the second foldable rod that is the farthest away from the external pipe fitting, the linkage rope can slip through the positioning component and is connected to the locking component, when the first and second foldable rods are in an unfolded state, the locking component is connected to the positioning component, the locking component positions the multi-section rod unit.

6. The apparatus according to claim 1, wherein, when the external pipe fitting is pulled outward in an opposite direction relative to the first foldable rod, the linkage rope is pulled and the locking component is separated and/or disengaged in terms of positive form-fit engagement from the positioning component, and the first and second foldable rods can be changed to a foldable state from the unfolded state.

7. The apparatus according to claim 1, wherein the positioning unit also comprises a guiding component provided in the first foldable rod in a movable way, a pipe stopper that is set on top of the positioning component and an elastic component, the guiding component can push the locking component so that the locking component axially moves relative to the positioning component, the elastic component is set between the pipe stopper and the locking component and provides elastic force for the locking component, and the linkage rope is directly or indirectly connected to the guiding component, render the locking component locked and connected relative to the positioning component and render the locking component released and/or far away from the positioning component.

8. The apparatus according to claim 1, wherein the positioning component of the positioning unit is hollow and comprises an inner ring surface that surrounds the axis and forms a pipe hole for the linkage rope to run through, multiple positioning teeth that surround the axis and are offset from the inner ring surface towards the axis and multiple chutes, one chute is set between two positioning teeth, each of the positioning teeth comprises a tooth crown part that surrounds the axis and is oblique, a slide guiding part that is set between the tooth crown part and an adjacent chute, surrounds the axis and is oblique, a stop part that is set between the tooth crown part and the slide guiding part and is parallel to the axis and a guiding slot that is parallel to the chutes and can be connected or leads to the tooth crown part.

9. The apparatus according to claim 1, wherein, the positioning unit comprises a guiding component which may slip through the pipe hole along the axis and comprises a straight pipe part, multiple dragging parts that surround the axis and are set on top of the straight pipe part and multiple guiding blocks that are set on the straight pipe part and can slide along the guiding slot, the dragging parts are in a V shape, each of the dragging parts comprises a pair of V-shaped dragging surfaces.

10. The apparatus according to claim 1, wherein the locking component comprises a hollow pipe wall and multiple locking clips that surround the axis and are set on the pipe wall, the pipe wall can define a penetration hole that is provided for the linkage rope to run through, each of the locking clips at the bottom comprises an oblique plane that corresponds to the tooth crown part and the slide guiding part of the positioning component.

11. The apparatus according to claim 1, wherein each of the positioning teeth of the positioning unit also comprises a guiding part that is set reversely to the tooth crown part and is in a V shape and the locking clips may smoothly fall and/or slide into the chutes from bottom to top under the effect of the guiding part.

12. The apparatus according to claim 1, wherein the linkage rope also comprises an upper knot and a lower knot that are set between the first end and the second end and are separated, an upper positioning block that can lock and position the upper knot and a lower positioning block that can lock and position the lower knot, the upper positioning block is set on the pipe wall and the lower positioning block is set at the bottom of the straight pipe part.

13. The apparatus according to claim 1, also comprising a quick release assembly that is set in where the external pipe fitting and the first foldable rod are connected, wherein the quick release assembly can be operated to make the first foldable rod lock and position the external pipe fitting after the first foldable rod retracts.

14. The apparatus according to claim 1,
wherein the plug-in connections within the multisection rod unit between the first and second foldable rod and in case of several second foldable rods within these, are configured in such a manner that on one pipe section they have a guide pin provided with an axially running central through opening for the linkage rope which is firmly fastened in this pipe section with a fastening section and axially opposite thereto has a pin region which can be slid into the other pipe section, and
wherein between fastening section and pin region there is provided a contact flange which in the assembled state is brought into axial contact with the pipe end of the other pipe section and/or with a pipe closure sleeve provided thereon.

15. The apparatus according to claim 1, further comprising at least four pipe sections, the external pipe fitting, first foldable rod and two second foldable rods.

16. The apparatus according to claim 1, further comprising a quick release assembly which takes the form of an external clamping device comprising a plastic sleeve which substantially directly embraces external pipe fitting at least in an axial section and clamps in the closed state,
wherein the plastic sleeve at least in the region embracing the external pipe fitting has at least one slot making the circumference of the plastic sleeve variable in this region and is configured to be substantially circumferential in the remaining axial region,
wherein respectively one projection is disposed on the plastic sleeve on both sides of this slot, wherein these projections have a coaxial through opening disposed substantially perpendicular to the axis of the external pipe fitting, through which a transverse pin grips, which pin has a stop on the outer side of the second projection and which, on the outer side of the first projection, has an axis of rotation for a clamping lever disposed perpendicular to the axis of the transverse pin and parallel to the axis of the external pipe fitting, wherein the clamping lever has a lever arm which, when the clamping device is closed, embraces the plastic sleeve at least partially, and
wherein the clamping lever has an eccentric rolling region about the axis of rotation by which means the distance between the stop and a mating surface for clamping disposed on the outer side of the first projection can be reduced by pivoting the clamping lever into the closed position.

17. The apparatus according to claim 16,
wherein the mating surface is configured in the form of a metal element disposed at least partially in the first projection in a recess and wherein the mating surface is configured as a flat surface or as a concave surface whose radius of curvature is substantially adapted to the radius of curvature of the rolling region.

18. The apparatus according to claim 16,
wherein the plastic sleeve has in its upper section at least two or at least three axially running slots, wherein at least one of these slots is disposed between the two projections and these slots are distributed uniformly around the circumference, or
wherein the said stop is configured to be adjustable.

19. The apparatus according to claim 18,
wherein the stop is configured with a thread and the transverse pin is configured with a counter-thread and the stop is configured as a nut or screw, with or without a circumferential toothed structure and/or a comb and/or a groove for engagement of an adjusting tool.

20. The apparatus according to claim 1,
wherein, when the external pipe fitting is pulled outward in an opposite direction relative to the first foldable rod, the linkage rope drives the guiding component to move along the axis, the guiding component then pushes the locking component to make it move upward relative to the positioning component and the oblique plane at the bottom of the locking clips is far away from the tooth crown part, the oblique plane at the bottom of the locking clips rotates around the axis under the guidance of the dragging surface, when the tension of the linkage rope is released during operation, the locking clips slide into the chutes under the guidance of the guiding part and the guiding component moves downward and is axially separated from the locking component and/or the positioning component inter-alia by using the elastic force released by the elastic component, and the first and second foldable rods may be folded to be in a foldable state and in parallel relative to the external pipe fitting.

21. The apparatus according to claim 1,
wherein it is in the form of a folding pole having at least three pipe sections and with a pole handle at an uppermost external pipe fitting and a tip at the opposite end of a lowermost pipe section.

22. The apparatus according to claim 1,
wherein said locking component is mounted such as to at least partly slide within an inner ring surface of said positioning component,
wherein said inner ring surface comprises at least one or more than one radially inwardly projecting positioning protrusions or positioning recessions, equally circumferentially distributed,
wherein the locking component comprises at least one or more than one corresponding radially outwardly projecting locking protrusions or locking recessions, equally circumferentially distributed, and
wherein positive form-fit engagement is achieved by way of engagement of the projecting positioning protrusions and the projecting locking protrusions and/or corresponding recessions.

23. The apparatus according to claim 1,
wherein there is further provided a guiding component, mounted such as to at least partly slide within an inner ring surface of said positioning component, and structured such as to at least partly encircle at least part of the locking component, and
wherein said guiding component is directly and/or indirectly coupled to the linkage rope and comprises guiding structural elements for dragging the locking component when the external pipe fitting is pulled axially apart from the multi-section rod unit and for controlling the rotational position of the locking component relative to the positioning component.

24. The apparatus according to claim 1,
wherein the locking component is set in the first foldable rod in a movable way, and
wherein the linkage rope comprises a first end that is fixed on the external pipe fitting and a second end that is opposite to the first end, the second end is connected to the second foldable rod that is the farthest away from the external pipe fitting, the linkage rope can slip through the positioning component and is connected to the locking component, when the first and second foldable rods are in an unfolded state, the locking component is connected to the positioning component, the locking component positions the multi-section rod unit, and when the foldable rods are in a foldable state, the locking component is axially separated from the positioning component.

25. The apparatus according to claim 1,
wherein the positioning component of the positioning unit is hollow and comprises an inner ring surface that surrounds the axis and forms a pipe hole for the linkage rope to run through, multiple positioning teeth that surround the axis and are offset from the inner ring surface towards the axis and multiple chutes, one chute is set between two positioning teeth, each of the positioning teeth comprises a tooth crown part that surrounds the axis and is oblique, a slide guiding part that is set between the tooth crown part and an adjacent chute, surrounds the axis and is oblique, a stop part that is set between the tooth crown part and the slide guiding part and is parallel to the axis and a guiding slot that is parallel to the chutes and can be connected or leads to the tooth crown part, and
wherein the tooth crown part and the slide guiding part lean towards the same direction.

26. The apparatus according to claim 1,
wherein the plug-in connections within the multisection rod unit, between the first and second foldable rod and in case of several second foldable rods within these, are configured in such a manner that on one pipe section they have a guide pin provided with an axially running central through opening for the linkage rope which is firmly fastened in this pipe section with a fastening section and axially opposite thereto has a pin region which can be slid into the other pipe section,
wherein between fastening section and pin region there is provided a radially circumferential outwardly directed contact flange which in the assembled state is brought into axial contact with the pipe end of the other pipe section and/or with a pipe closure sleeve provided thereon,
wherein this axial stop is configured asymmetrically about the pole axis, and/or
wherein the pin region has an at least partially conically tapering region at its end facing the other pipe section.

27. The apparatus according to claim 1,
wherein the quick release assembly takes the form of an external clamping device comprising a plastic sleeve which substantially directly embraces external pipe fitting at least in an axial section and clamps in the closed state, wherein the plastic sleeve at least in the region embracing the external pipe fitting has at least one slot making the circumference of the plastic sleeve variable in this region and is configured to be substantially circumferential in the remaining axial region, wherein respectively one projection is disposed on the plastic sleeve on both sides of this slot,
wherein said projections have a coaxial through opening disposed substantially perpendicular to the axis of the external pipe fitting, through which a transverse pin grips, which pin has a stop on the outer side of the second projection and which, on the outer side of the first projection, has an axis of rotation for a clamping lever disposed perpendicular to the axis of the transverse pin and parallel to the axis of the external pipe fitting,
wherein the clamping lever has a lever arm which, when the clamping device is closed, embraces the plastic sleeve at least partially,
wherein the clamping lever has an eccentric rolling region about the axis of rotation by which means the distance between the stop and a mating surface for clamping disposed on the outer side of the first projection can be reduced by pivoting the clamping lever into the closed position,
wherein the mating surface is configured in the form of a metal element disposed at least partially in the first projection in a recess and wherein further the mating surface is configured as a flat surface or as a concave surface whose radius of curvature is substantially adapted to the radius of curvature of the rolling region,
wherein the plastic sleeve has in its upper section at least two or at least three axially running slots, wherein at least one of these slots is disposed between the two projections and these slots are distributed uniformly around the circumference and/or wherein further the said stop is configured to be adjustable, and
wherein the stop is configured with a thread and the transverse pin is configured with a counter-thread and the stop is configured as a nut or screw, with a circumferential toothed structure and/or a comb and/or a groove for engagement of an adjusting tool.

* * * * *